United States Patent
Toyama (10) Patent No.: US 6,606,169 B1
(45) Date of Patent: Aug. 12, 2003

(54) IMAGE READING SYSTEM (75) Inventor: Masaki Toyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 323 days.

(21) Appl. No.: 09/654,034

(22) Filed: Sep. 1, 2000

Related U.S. Application Data (62) Division of application No. 08/932,702, filed on Sep. 18, 1997, now Pat. No. 6,151,138.

(30) Foreign Application Priority Data

Sep. 19, 1996 (JP) .............................. 8-247966

(51) Int. Cl.⁷ .............................. H04N 1/32; H04N 1/04
(52) U.S. Cl. ........................ 358/442; 358/474; 358/409; 358/468
(58) Field of Search .................. 358/442, 468, 358/474, 437, 497, 496, 494, 488, 486, 409, 412, 473; 382/312, 313

(56) References Cited

U.S. PATENT DOCUMENTS

| | | | |
|---|---|---|---|
| 5,499,108 A | 3/1996 | Cotte et al. | 358/400 |
| 5,517,332 A | 5/1996 | Barry et al. | 358/496 |
| 5,532,844 A | 7/1996 | Kagami et al. | 358/468 |
| 5,623,285 A | 4/1997 | Aharonson | 345/168 |
| 6,188,807 B1 * | 2/2001 | Arakawa | 382/319 |

FOREIGN PATENT DOCUMENTS

| | | |
|---|---|---|
| EP | 0 532 837 | 3/1993 |
| EP | 0 878 951 | 11/1998 |
| JP | 63-048046 | 2/1988 |
| JP | 4-119163 | 10/1992 |
| JP | 6-070075 | 3/1994 |
| JP | 8-110825 | 4/1996 |
| JP | 8-190519 | 7/1996 |

* cited by examiner

Primary Examiner—Cheukfan Lee
(74) Attorney, Agent, or Firm—Fitzpatrick, Cella, Harper & Scinto

(57) ABSTRACT

In an image reading system having an image reading apparatus for reading the image of a document and an information processing terminal which receives the image data output by the image reading apparatus, the information processing terminal verifies the kind of operation performed at a control panel of the image reading apparatus, calls an image reading module and instructs the image reading apparatus to perform an operation based upon the kind of operation. The image reading apparatus responds by reading the image of the document, and the information processing terminal accepts the image data obtained and stores the image data in a predetermined area of a hard disk. This makes it possible to operate the image reading system efficiently.

28 Claims, 5 Drawing Sheets

IMAGE READING SYSTEM

This application is a division of application Ser. No. 08/932,702 filed Sep. 18, 1997, now U.S. Pat. No. 6,151,138.

BACKGROUND OF THE INVENTION

This invention relates to an image reading system having an image reading apparatus for reading the image of a document and an information processing terminal for controlling the image reading apparatus.

An image reading system conventionally has an image reading apparatus and an information processing terminal. The image reading apparatus is instructed to start the reading of an image by an operation performed at the information processing terminal. In a scenario where the reading apparatus is connected to a LAN and is shared by a plurality of information processing terminals, however, the reading apparatus and the information processing terminals would most likely be placed at physically remote locations and therefore it would be considered useful to provide means through which the command to start reading could be issued directly from the image reading apparatus itself.

However, if it is so arranged that a command to start reading can be accepted from both the image processing apparatus and the information processing terminals, a problem would arise in which reading start commands might be entered by a plurality of users simultaneously.

SUMMARY OF THE INVENTION

An object of the present invention is to solve the above-mentioned problem.

Another object of the present invention is to provide a system in which an image read command for transfer of an image to an information processing terminal can be issued by operation of an image reading apparatus, at which time the information processing terminal is caused to manage the command information.

Another object of the present invention is to provide a system in which processing contention can be prevented by reserving the reading of an image.

Another object of the present invention is to provide a system in which the reading of an image can be carried out by exchange commands made to conform to the specifications of a general-purpose interface.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
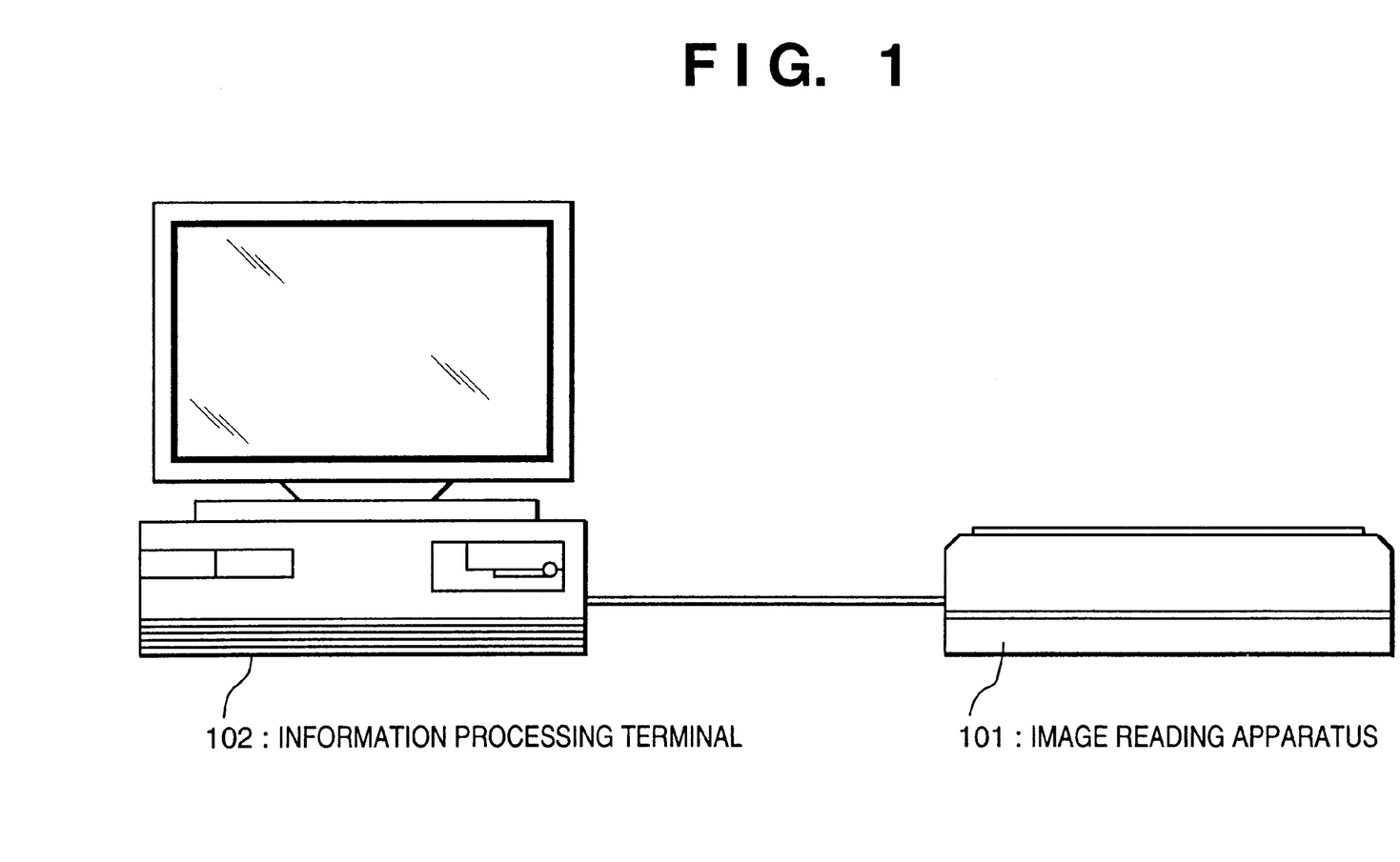
FIG. 1 is a diagram showing the configuration of an image reading system according to an embodiment of the present invention.

FIG. 1 is a diagram showing the configuration of an image reading system according to an embodiment of the present invention. As shown in FIG. 1, the system includes an image reading apparatus (referred to as a "scanner" below) 101 having an interface for connection to an information processing terminal 102. The scanner 101 optically reads a document in the form of a sheet or book, converts the optical data to electrical image data and outputs the image data to the information processing terminal 102. It should be noted that the scanner 101 starts reading a document in response to a command from the information processing terminal 102 connected thereto. Further, the scanner 101 accepts a user-initiated command from a control panel, described later.

Figure 2:
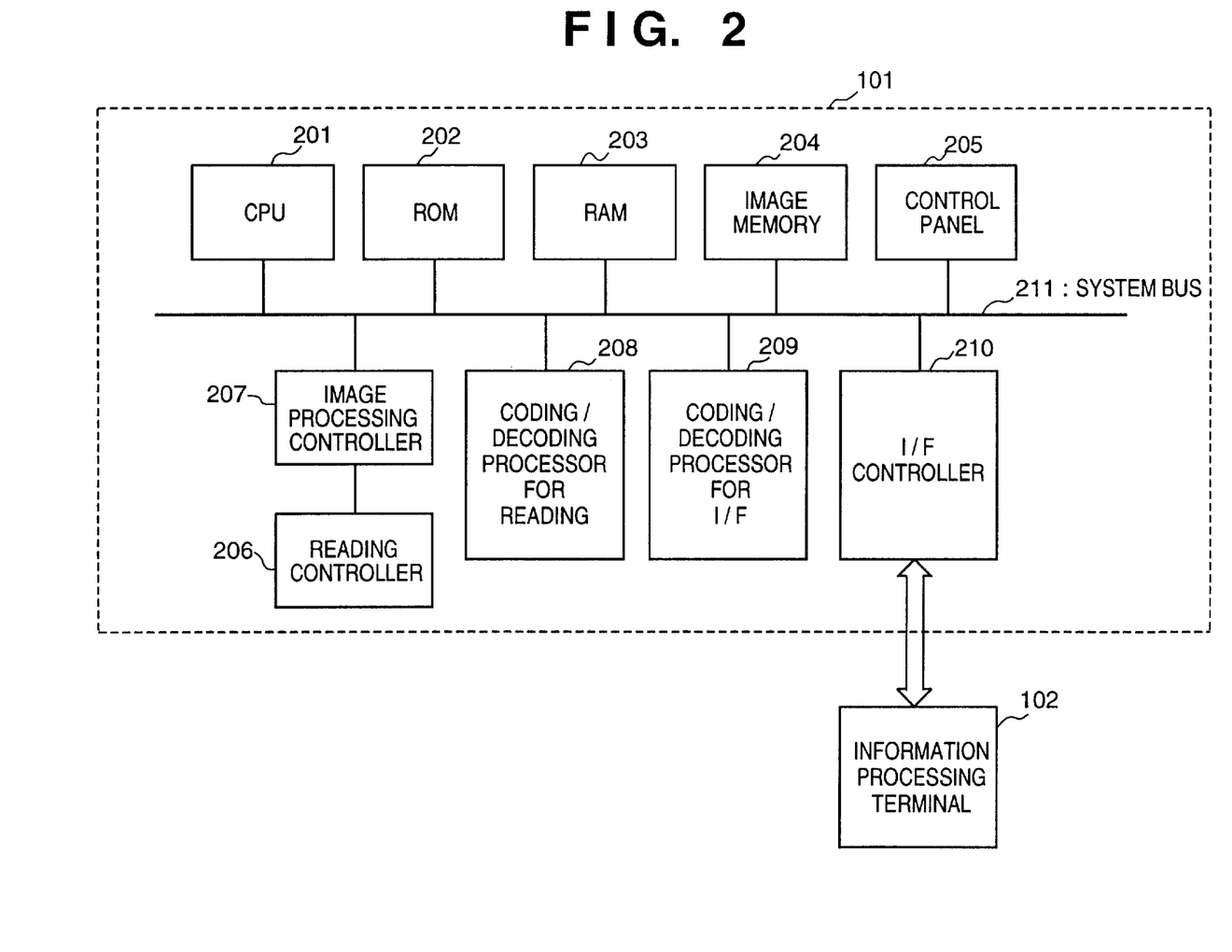
FIG. 2 is a block diagram showing the internal construction of a scanner included in the system of FIG. 1.

FIG. 2 is a block diagram showing the internal construction of the scanner 101. The scanner includes a CPU 201 serving as a system controller for controlling the overall scanner 101 via a system bus 211. A ROM 202 stores the control program of the CPU 201, an operating system (OS) program, etc. A RAM 203 is constituted by e.g. an SRAM or the like and stores control program variables. Setting values registered by the operator and system management data are stored in the RAM 203, which functions also as various working buffers.

An image memory 204 is constituted by e.g. a DRAM or the like and stores entered image data. According to this embodiment, each control program that has been stored in the ROM 202 controls software for scheduling and task switches and the like under the supervision of the OS stored in the ROM 202.

A control panel 205, which is constituted by various keys, LEDs and an LCD, etc., allows an operator to make various entries and presents a display of the operating status of the image reading system.

A reading controller 206 is constituted by e.g. a CS image sensor, a document transport mechanism, etc. The reading controller 206 reads the image of a document optically using the CS image sensor and converts the optical signal to electrical image data. The image data resulting from the conversion is subjected to various processing such as binarization and halftoning by an image processing controller 207. The result is high-definition image data. The converted image data is coded in accordance with a predetermined coding scheme via a coding/decoding controller 208 for reading purposes, and the coded data is stored in the image memory 204.

An I/F controller 210 performs control for interfacing the information processing terminal 102, which is externally connected to the scanner 101. In this embodiment, the I/F controller 210 corresponds to a parallel interface such as a bidirectional Centronics interface. When image data is transferred to the external information processing terminal 102, a coding processor 209 for interfacing purposes performs the necessary decoding/coding processing, which depends upon the type of image data that has been stored in the image memory 204, and enters the image data into the information processing terminal 102.

The information processing terminal 102 is a general-purpose personal computer and is equipped with an MPU, a hard disk, a keyboard and a display, etc. The information processing terminal 102 is capable of being connected to a LAN in addition to the scanner 101, and a plurality of client terminals on the LAN are capable of accepting image data, which enters from the scanner 101, via the intermediary of the information processing terminal 102.

A remote operation from the information processing terminal 102 to the scanner 101 is carried out by transmitting predetermined command parameter data and the like to the scanner 101 via the I/F controller 210.

According to this embodiment, the information processing terminal 102 and the scanner 101 perform an exchange of information using a protocol in line with IEEE 1284. Further, a special channel is not provided in accordance with the standard specifications of this protocol. In principle, therefore, the information processing terminal 102 takes the initiative in terms of communication with the scanner 101. Except in the case of a defined alert, the scanner 101 does not itself send a reply to the information processing terminal 102. In a case where the scanner 101 sends a reply back to the information processing terminal 102, it is necessary for a reply required flag to be set in a message from the information processing terminal 102. The information processing terminal 102 is capable of recognizing the status of the scanner 101 (e.g. the kind of operation performed at the control panel 205) from the status of the flag.

According to this embodiment, application software and driver software for controlling the remote operation and the request for the remote operation is installed on the hard disk in the information processing terminal 102.

Figure 3:
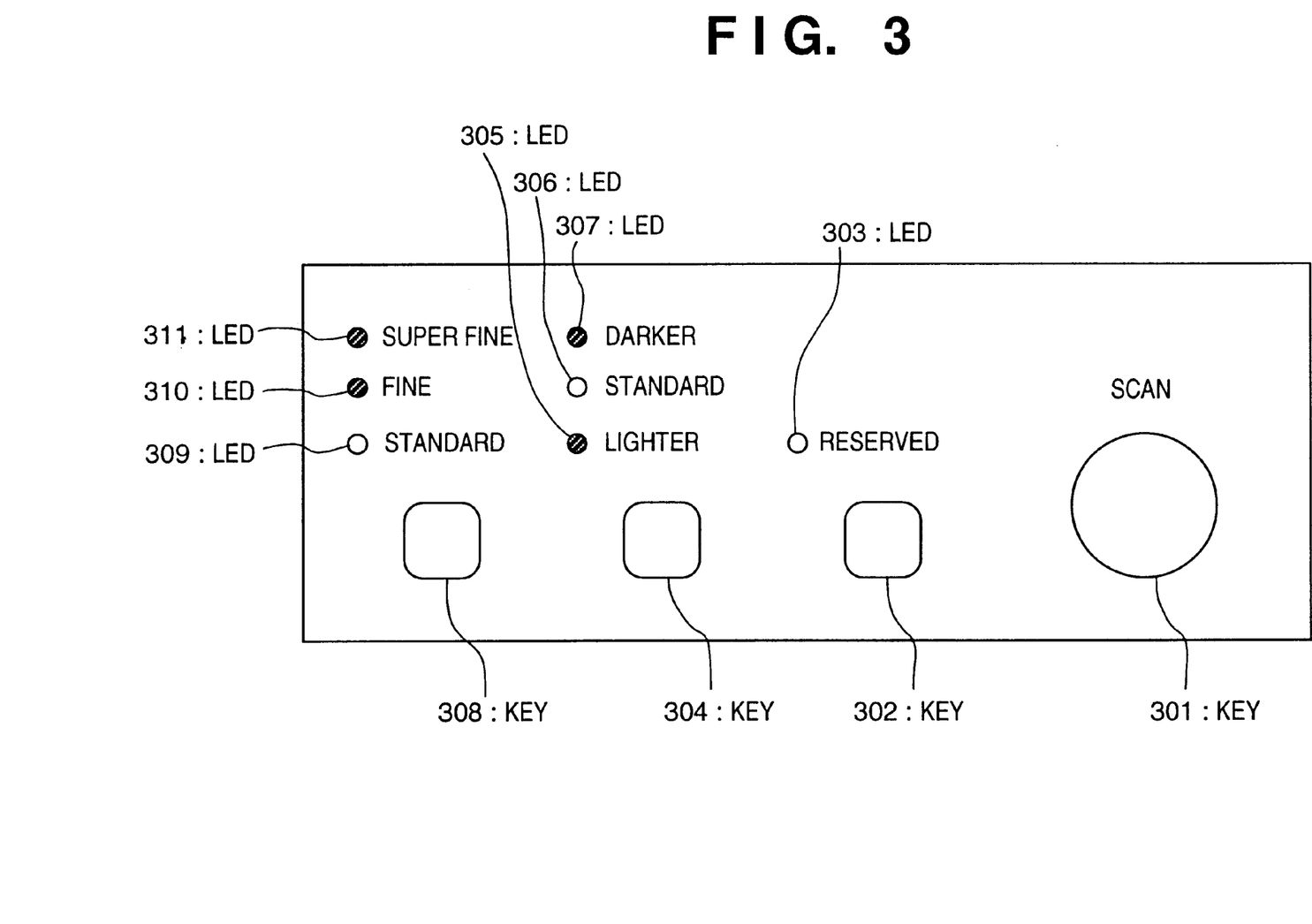
FIG. 3 is a diagram showing the arrangement of a control panel on the scanner shown in FIG. 2.

FIG. 3 is a diagram showing the arrangement of the control panel 205 on the scanner 101. As shown in FIG. 3, the control panel 205 has a key 301 for designating start of a document reading operation, a key 302 for reserving start of the document reading operation, an LED 303 which indicates whether the start of the document reading operation has been reserved or not, and a key 304 for designating density at the time of the document reading operation.

The control panel 205 further includes has LEDs 305, 306, 307 which indicate the document reading density designated by the key 304. Whenever the key 304 is pressed, the LEDs light in the order of LED 305→LED 306→LED 307→LED 305 . . . .

A key 308 is for designating resolution at the time of the document reading operation), and LEDs 309, 310, 311 indicate the document reading resolution designated by the key 308. Whenever the key 308 is pressed, the LEDs light in the order of LED 309→LED 310→LED 311→LED 309 . . . .

In a case where the key 301 or 302 has been pressed, the information processing terminal 102 is so notified. The lighting and extinguishment of the LED 303 can be controlled from the information processing terminal 102. Further, each key is operated by a manual operation performed by the operator.

Figure 4:
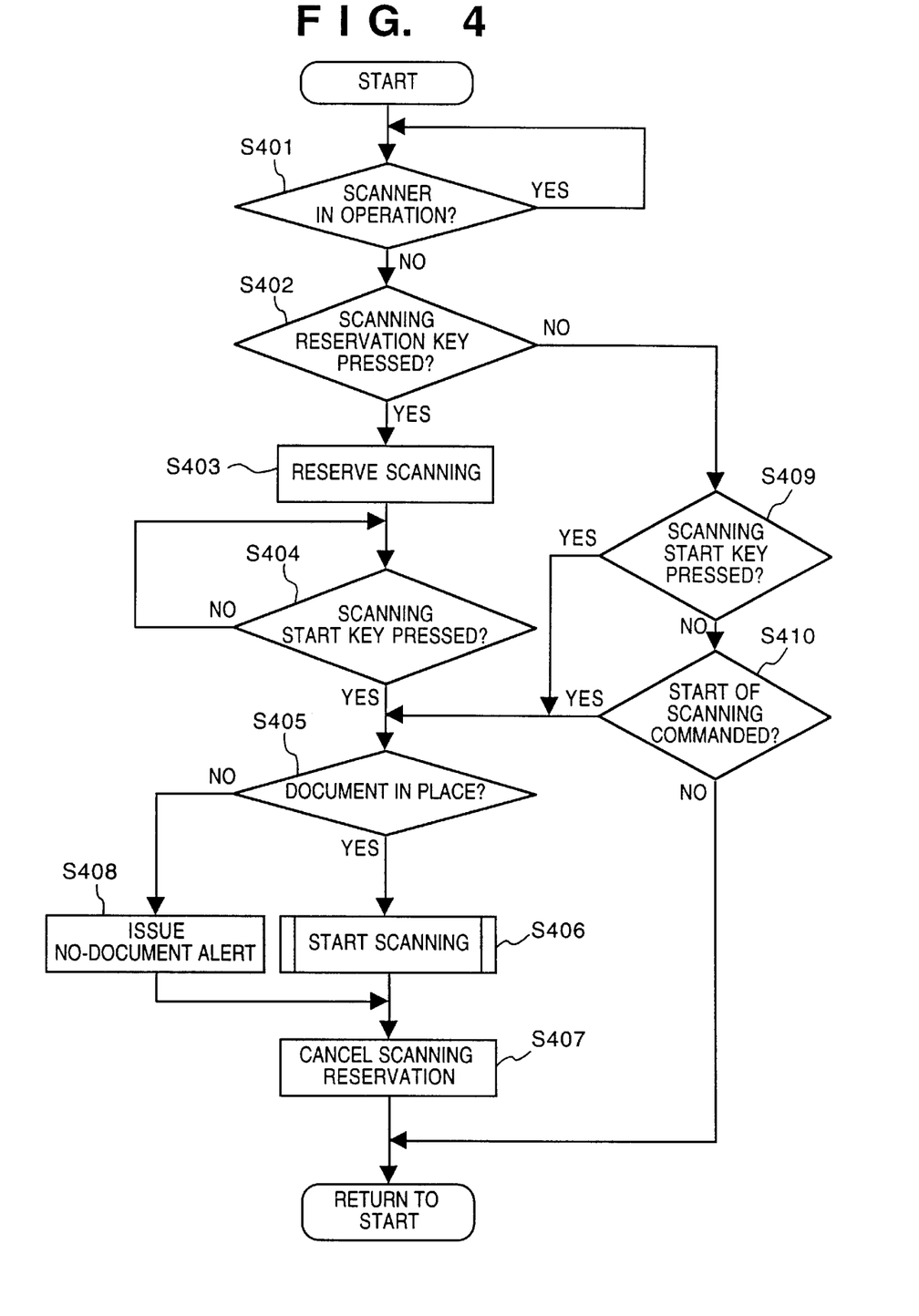
FIG. 4 is a flowchart illustrating a control procedure executed when an information processing terminal in FIG. 1 controls the scanner.

FIG. 4 is a flowchart illustrating a procedure through which the information processing terminal 102 of this embodiment controls the scanner 101. The flowchart indicates the flow of control executed by the MPU of the information processing terminal 102 based upon an application program installed in the hard disk under the control of the MPU.

It is determined at step S401 in FIG. 4 whether the scanner is currently reading a document. If a document is currently being read, the operation of step S401 is repeated. If reading of a document is not in progress, then the program proceeds to step S402. Here it is determined whether notification of depression of the key 302 (the key which reserves the start of the document reading operation) has been given. If it is judged that the key 302 has been pressed, then the program proceeds to step S403; otherwise, the program proceeds to step S409.

The scanner 101 is instructed to store the fact that reading of an image has been reserved by an input from the control panel 205 and to light the corresponding LED 303 at step S403. Under these conditions a read command from the keyboard of the information processing terminal 102 will not be excepted. This is followed by step S404, at which it is determined whether notification of depression of key 301 has been given. If the key 301 (the key which designates the start of the document reading operation) has been pressed, the program proceeds to step S405. If the key 301 has not been pressed, then the processing of step S404 is repeated.

It is determined at step S405 whether the document to be read has been set in the scanner 101. The program proceeds to step S406 if the document has been set and to step S408 if the document has not been set. More specifically, at step S406, an image reading module is called and the scanner 101 is instructed to start reading of the image of the document. The scanner 101 reads the image of the document and the image data so obtained is read out of the image memory 204, received via the I/F controller 210 and stored in a predetermined area of the hard disk of the information processing terminal 102.

This is followed by step S407, at which the scanner 101 is instructed to cancel the image reading reservation stored at step S403 and to extinguish the LED 303.

At step S408, the fact that a document to be read has not been set in the scanner 101 is displayed on a display unit of the information processing terminal 102 to so notify the user of the information processing terminal.

If it is judged at step S402 that the key 302 is not being pressed, the program proceeds to step S409, at which it is determined whether the key 301 has been pressed. The program proceeds to step S405 if the key 301 has been pressed and to step S410 if the key 301 has not been pressed.

It is determined at step S410 whether a command to start reading of an image has been accepted from the information processing terminal 102. If this command has been accepted, the program proceeds to step S405 and it is determined whether or not a document to be copied is present. If the command to start reading of an image has not been accepted, then the program returns to the beginning, namely to step S401.

Figure 5:
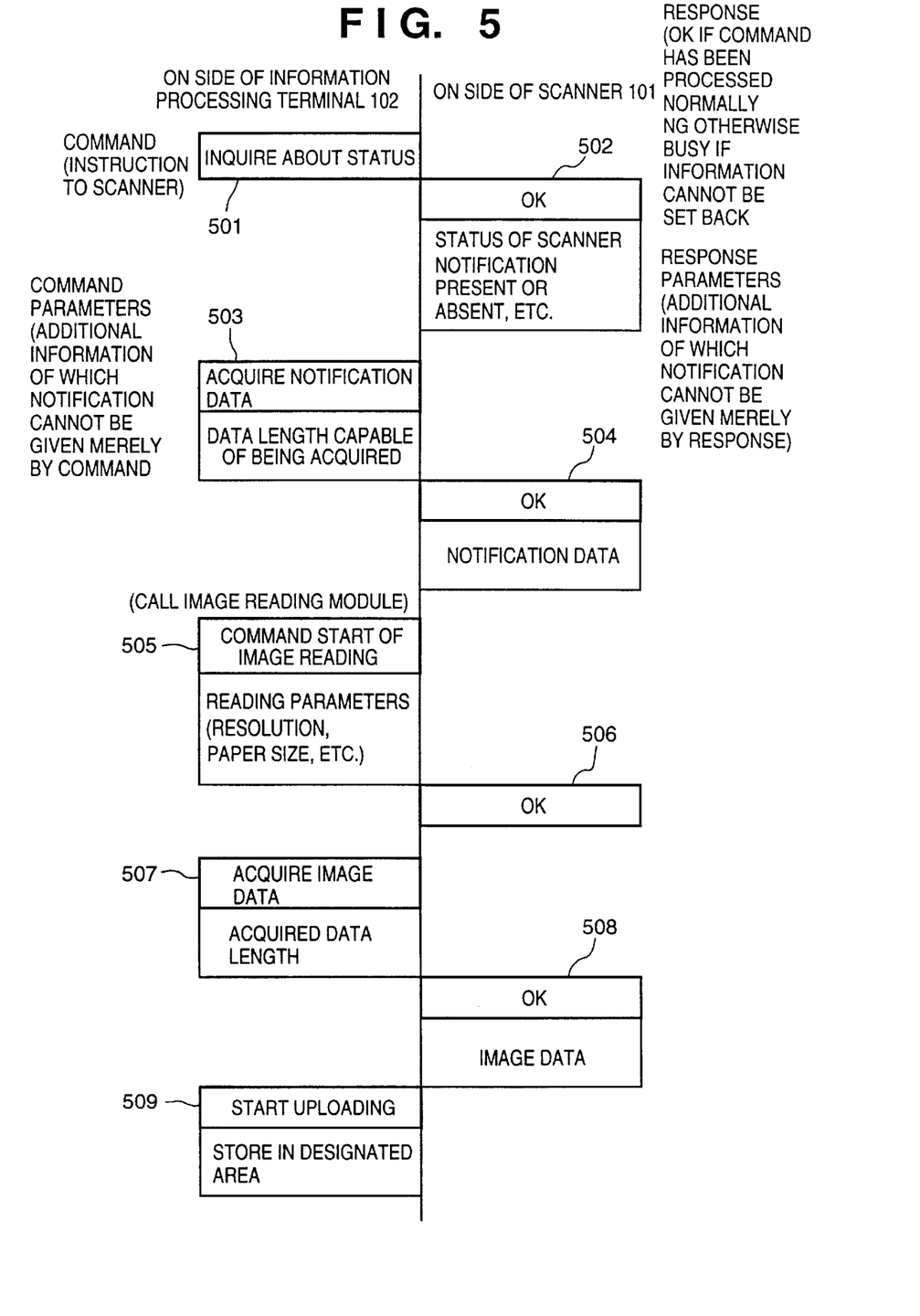
FIG. 5 is a schematic view showing the flow of data between the scanner and the information processing terminal.

FIG. 5 is a schematic view showing the flow of data between the scanner 101 and information processing terminal 102.

In this embodiment, the scanner 101 and information processing terminal 102 send and receive information based upon IEEE 1284. Accordingly, the exchange of all information is carried out through a procedure in which the scanner 101 sends back a reply in response to a command issued by the information processing terminal 102.

At predetermined fixed intervals the information processing terminal 102 transmits a command inquiring about the operating status of the scanner 101 (501). In response to the command from the information processing terminal 102, the scanner 101 sends a signal indicative of the operating status (e.g. the information mentioned in step S401) back to the information processing terminal 102 (502). More specifically, in regard to the operating status, the scanner 101 writes the relevant information to a prescribed area of the image memory 204, and this information is verified by the information processing terminal 102. Upon verifying that there is notification data based upon the reply (502) from the scanner 101, the information processing terminal 102 prepares to accept further information from the scanner 101 by a notification data acceptance command (503).

The information processing terminal 102 is notified (504) of operation of the keys 301 and 302. In a case where the keys 301 and 302 have been operated, the scanner 101 accumulates-predetermined data in the image memory 204 in order to notify the information processing terminal 102 of key operation. By transmitting the command inquiring about the operating status of the scanner 101, the information processing terminal 102 is capable of ascertaining that data has been accumulated in the image memory 204. Accordingly, the information processing terminal 102 again issues a command (503) for acceptance of data and thereby is capable of ascertaining that the keys have been pressed. Though the description is omitted here it is assumed that the verification operation of step S405, etc., is also carried out by command and response.

When the kind of operation performed by the operator at the control panel 205 is verified, the information processing terminal 102 calls an image reading module and causes the reading of a document to be performed (505) by a reading start command in accordance with the kind of setting made at the control panel 205 of the scanner 101.

Upon receiving a normal response (506) from the scanner 101, the information processing terminal 102 issues a command (507) for the purpose of accepting image data obtained by reading of the document. Uploading (509) of the image data is started by a normal response (508) from the scanner 101. The image data is stored on the hard disk of the information processing terminal 102 in an area designated by the operator using the control panel 205. (It should be noted that an area for each user is prepared on the hard disk.)

In accordance with this embodiment, as described above, an image reading operation by the scanner 101 can be commanded from both the scanner 101 and the information processing terminal 102, and all of these commands are managed by the information processing terminal 102. As a result, a plurality of users can share the scanner 101 and it is possible to prevent contention among reading start commands from a plurality of terminals or the like.

An arrangement may be adopted in which an operation for reading an image is performed solely by operating the control panel 205. In other words, since it is required that the user bring the document to the location of the scanner 101, manipulating the control panel 205 at such time is easier than performing an operation at the information processing terminal 102. Accordingly, by making it possible to designate initiation of an image reading operation solely from the control panel 205 and actually start operation based upon a command from the information processing terminal, contention among initiation commands can be prevented and processing on the side of the information processing terminal can be simplified.

Further, according to this embodiment, the kind of operation performed at the control panel 205 of the scanner 101 is stored in a predetermined area of the image memory 204, and the information processing terminal verifies the kind of operation. As a result, the information processing terminal can be notified of the status of scanner 101 even if a special channel is not provided in accordance with the specifications of the IEEE 1284 standard.

Further, according to this embodiment, the invention is described taking a single scanner as an example. However, this does not impose a limitation upon the invention, for it goes without saying that the invention can be applied to facsimile machines and copiers as well.

It should be noted that the present invention is not limited to the foregoing embodiment but can be modified as set forth below without departing from the gist of the invention.

Specifically, in a case where processing for canceling the reservation of an image reading operation is executed in the foregoing embodiment, control can be carried out in such a manner that the program will proceed to step S407 if notification of depression of the key 302 is given at step S404 in FIG. 4. This will make it possible to cancel the scanning reservation.

Further, by performing control in the foregoing embodiment in such a manner that time is counted at step S404 in FIG. 4 and the program proceeds to step S407 when a predetermined period of time expires, reservation of scanning can be canceled automatically in a case where scanning is left reserved and the start of scanning is commanded.

Further, an arrangement may be adopted in which the scanner 101 monitors the elapse of time from depression of the key 302 and notifies the information processing terminal 102 of the elapsed time. Meanwhile, control is exercised such that, at step S404 in FIG. 4, the time at which notification is given by the scanner 101 is monitored and, when a predetermined period of time has elapsed, the program proceeds to step S407. This also makes it possible to cancel reservation of scanning automatically in a case where scanning is left reserved and the start of scanning is not commanded despite passage of time.

Further, in the embodiment described above, the scanner 101 can be provided with means for monitoring elapse of time from depression of the key 302 and means for notifying the information processing terminal 102 of cancellation of reservation of the reading operation, and control can be performed in such a manner that the program proceeds to step S407 if notification of cancellation of image reading reservation is given by the scanner 101 at step S404 in FIG. 4. This also makes it possible to cancel reservation of scanning automatically in a case where scanning is left reserved and the start of scanning is not commanded despite passage of time.

It goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. In an image reading system having an image reading apparatus for reading an image on a document and outputting image data representing the image, and an information processing terminal into which the image data output by said image reading apparatus is entered, a method of controlling said image reading system comprising:

a first reception step of receiving an instruction to read the image by said image reading apparatus from said image reading apparatus;

a second reception step of receiving a command for reading the image by said image reading apparatus from said information processing terminal;

a setting step of setting image reading by said image reading apparatus based on the instruction or command received in said first and second reception steps; and a control step of controlling said image reading apparatus so as to prevent collision of the image reading.

2. The method according to claim 1, wherein said control step controls the reception in said second reception step so as not to receive the command in a case where the image reading based on the instruction received in said first reception step is set by said setting step.

3. The method according to claim 1, further comprising a displaying step of displaying a status of said image reading apparatus, wherein said displaying step displays that the image reading based on the instruction received in said first reception step is set by said setting step.

4. A computer readable program, stored on a storage medium, for controlling an information processing terminal in an image reading system having an image reading apparatus for reading the image on a document and outputting image data representing the image, and said information processing terminal into which the image data output by said image reading apparatus is entered, said program comprising:

program code for receiving an instruction to read the image by said image reading apparatus from said image reading apparatus;

program code for receiving a command for reading the image by said image reading apparatus from said information processing terminal;

program code for setting image reading by said image reading apparatus based on the received instruction or command; and program code for controlling said image reading apparatus so as to prevent collision of the image reading.

5. An image reading apparatus comprising:

a connecting unit adapted to connect an information processing terminal;

a reading unit adapted to read an image on a document and generating image data representing the image;

a designating unit adapted to designate a reading parameter for reading the image by said reading unit based on a manual instruction;

a storing unit adapted to store the reading parameter designated by said designating unit;

an information unit adapted to inform the reading parameter stored by said storing unit to the information processing terminal through said connecting unit;

a receiving unit adapted to receive a command for reading the image on the document based on the reading parameter informed by said information unit from the information processing terminal through said connecting unit; and a control unit adapted to control said reading unit so as to read the image on the document in accordance with the command received by said receiving unit.

6. The apparatus according to claim 5, wherein said designating unit designates resolution of the image as the reading parameter.

7. The apparatus according to claim 5, wherein said designating unit designates density of the image as the reading parameter.

8. The apparatus according to claim 5, further comprising a display unit adapted to display the reading parameter designated by said designating unit.

9. The apparatus according to claim 5, wherein said connecting unit performs data communication with a protocol according to IEEE 1284.

10. A method of controlling an image reading apparatus connectable to an information processing terminal comprising:

a reading step of reading an image on a document;

a designating step of designating a reading parameter for reading the image in said reading step based on a manual instruction;

a storing step of storing the reading parameter designated in said designating step;

an information step of informing the reading parameter stored in said storing step to the information processing terminal;

a receiving step of receiving a command for reading the image on the document based on the reading parameter informed in said information step from the information processing terminal; and a control step of controlling said reading step so as to read the image on the document in accordance with the command received in said receiving step.

11. In an image reading system having an image reading apparatus for reading an image on a document and outputting image data representing the image, and an information processing terminal into which the image data output by said image reading apparatus is entered, a method of controlling said information processing terminal comprising:

a verification step of verifying a reading parameter set in said image reading apparatus; and a commanding step of commanding said image reading apparatus to read the image in accordance with the reading parameter verified in the verification step.

12. The method according to claim 11, wherein said verification step further verifies whether an image reading instruction has been issued by said image reading apparatus.

13. The method according to claim 11, wherein said verification step verifies resolution of the image as the reading parameter.

14. The method according to claim 11, wherein said verification step verifies density of the image as the reading parameter.

15. A computer readable program, stored on a storage medium, for controlling an information processing terminal in an image reading system having an image reading apparatus for reading the image on a document and outputting image data representing the image, and said information processing terminal into which the image data output by said image reading apparatus is entered, said program comprising:

program code for verifying a reading parameter set in said image reading apparatus; and program code for commanding said image reading apparatus to read the image in accordance with the verified reading parameter.

16. In an image reading system having an image reading apparatus for reading an image on a document and outputting image data representing the image, and an information processing terminal into which the image data output by said image reading apparatus is entered, a method of controlling said information processing terminal comprising:

a verification step of verifying whether an image reading instruction has been issued by said image reading apparatus;

a first commanding step of commanding said image reading apparatus to start reading of the image on the document by said image reading apparatus in response to the image reading instruction verified in said verification step;

a second commanding step of commanding said image reading apparatus to start reading of the image on the document by said image reading apparatus without the image reading instruction from said image reading apparatus; and a receiving step of receiving image data which is the result of said image reading apparatus reading the image based on the command in said first and second commanding step.

17. The method according to claim 16, wherein said verification step further verifies a reading parameter set in said image reading apparatus.

18. The method according to claim 16, further comprising a detection step of detecting whether the document is set at said image reading apparatus.

19. The method according to claim 16, further comprising a determination step of determining an error status of said image reading apparatus and a canceling step of canceling image reading commanded in said first and second commanding step.

20. A computer readable program, stored on a storage medium, for controlling an information processing terminal in an image reading system having an image reading apparatus for reading the image on a document and outputting image data representing the image, and said information processing terminal into which the image data output by said image reading apparatus is entered, said program comprising:

program code for verifying whether an image reading instruction has been issued by said image reading apparatus;

program code for commanding said image reading apparatus to start reading of the image on the document by said image reading apparatus in response to the verified image reading instruction;

program code for commanding said image reading apparatus to start reading of the image on the document by said image reading apparatus without the image reading instruction from said image reading apparatus; and program code for receiving image data which is the result of said image reading apparatus reading the image based on the command.

21. In an image reading system having an image reading apparatus for reading an image and outputting image data representing the image, and an information processing terminal into which the image data outputted from said image reading apparatus is entered, a method of controlling said information processing terminal comprising:

a verification step of verifying whether or not an image reading instruction is issued by a control panel of said image reading apparatus;

a first image reading step of reading the image in a predetermined sequence if it is verified by said verification step that the image reading instruction has been issued; and a second image reading step of reading the image in the predetermined sequence without verifying the image reading instruction from the control panel, wherein the sequence comprises: the commanding of said image reading apparatus to start reading of the image by a command from said information processing terminal; the reading of the image by said image reading apparatus based on the command; and the receiving of image data outputted from said image reading apparatus by said information processing terminal.

22. The method according to claim 21, further comprising a step of calling up an image reading module, wherein the image reading module controls the sequence.

23. The method according to claim 22, wherein the image reading module is called up if it is verified by said verification step that the image reading instruction has been issued.

24. In an image reading system having an image reading apparatus for reading an image and outputting image data representing the image, and an information processing terminal into which the image data outputted from said image reading apparatus is entered, a method of controlling said image reading system comprising:

an instruction input step of inputting a reading instruction from a control panel of said image reading apparatus;

a verification step of verifying the reading instruction inputted by said instruction input step in accordance with a command from said information processing terminal;

a first image reading step of executing a predetermined sequence if the reading instruction from the control panel of said image reading apparatus is verified by said verification step; and a second image reading step of executing the predetermined sequence without verifying the reading instruction by said instruction input step, wherein the sequence comprises: the commanding of said image reading apparatus to start reading of the image by the command from said information processing terminal; the reading of the image by said image reading apparatus based on the command; and the receiving of image data outputted from said image reading apparatus by said information processing terminal.

25. The method according to claim 24, further comprising a step of calling up an image reading module by said information processing terminal, wherein the image reading module controls the sequence.

26. The method according to claim 25, wherein the image reading module is called up if it is verified by said verification step that the image reading instruction has been issued.

27. The method according to claim 24, wherein when said image reading apparatus transfers information to said information processing terminal, the information is transferred as a response to the command from said information processing terminal.

28. A computer readable program, stored on a storage medium, for controlling an information processing terminal in an image reading system having an image reading apparatus for reading an image and outputting image data representing the image, and an information processing terminal into which the image data outputted from said image reading apparatus is entered, said program comprising:

program code for verifying whether or not an image reading instruction is issued by a control panel of said image reading apparatus;

program code for reading the image in a predetermined sequence if it is verified that the image reading instruction has been issued; and program code for reading the image in the predetermined sequence without the image reading instruction from the control panel, wherein the sequence comprises: the commanding of said image reading apparatus to start reading of the image by a command from said information processing terminal; the reading of the image by said image reading apparatus based on the command; and the receiving of image data outputted from said image reading apparatus by said information processing terminal.

* * * * *